(12) United States Patent
Iniguez

(10) Patent No.: US 10,592,275 B2
(45) Date of Patent: *Mar. 17, 2020

(54) SYSTEM AND METHOD FOR SWARM COLLABORATIVE INTELLIGENCE USING DYNAMICALLY CONFIGURABLE PROACTIVE AUTONOMOUS AGENTS

(71) Applicant: Swarm Technology LLC, Mesa, AZ (US)

(72) Inventor: Alfonso Iniguez, Mesa, AZ (US)

(73) Assignee: Swarm Technology LLC, Mesa, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/852,480

(22) Filed: Dec. 22, 2017

(65) Prior Publication Data

US 2018/0121238 A1 May 3, 2018
US 2018/0293096 A2 Oct. 11, 2018

Related U.S. Application Data

(63) Continuation of application No. 14/340,332, filed on Jul. 24, 2014, now Pat. No. 9,852,004, which is a (Continued)

(51) Int. Cl.
*G06F 9/46* (2006.01)
*G06F 9/48* (2006.01)
(Continued)

(52) U.S. Cl.
CPC .......... *G06F 9/4843* (2013.01); *G06F 9/5044* (2013.01); *G06F 9/54* (2013.01); *G06F 9/544* (2013.01); *G06F 2209/5017* (2013.01)

(58) Field of Classification Search
None
See application file for complete search history.

(56) References Cited

U.S. PATENT DOCUMENTS 6,330,583 B1 12/2001 Reiffin
7,082,604 B2 7/2006 Schneiderman
(Continued)

FOREIGN PATENT DOCUMENTS

WO   WO 00/11561   3/2000

OTHER PUBLICATIONS

Tozlu et al. ("Wi-Fi Enabled Sensors for Internet of Things: A Practical Approach", IEEE Communications Magazine, Jun. 2012).*
(Continued)

*Primary Examiner* — Wissam Rashid
(74) *Attorney, Agent, or Firm* — Jennings, Strouss & Salmon PLC; Michael K. Kelly; Daniel R. Pote

(57) ABSTRACT

A parallel processing architecture includes a CPU, a task pool populated by the CPU, and a plurality of autonomous co-processing cells each having an agent configured to proactively interrogate the task pool to retrieve tasks appropriate for a particular co-processor. Each co-processor communicates with the task pool through a switching fabric, which facilitates connections for data transfer and arbitration between all system resources. Each co-processor notifies the task pool when a task or task thread is completed, whereupon the task pool notifies the CPU.

17 Claims, 6 Drawing Sheets

Related U.S. Application Data continuation of application No. 13/750,696, filed on Jan. 25, 2013, now Pat. No. 9,146,777.

(51) Int. Cl.
  *G06F 9/54* (2006.01)
  *G06F 9/50* (2006.01)

(56) References Cited

U.S. PATENT DOCUMENTS

| | | |
|---|---|---|
| 7,159,215 B2 | 1/2007 | Shavit et al. |
| 7,174,381 B2 | 2/2007 | Gulko et al. |
| 7,665,117 B2 | 2/2010 | Sequeria |
| 7,908,313 B2 | 3/2011 | Lurie |
| 8,037,474 B2 | 10/2011 | Bates et al. |
| 8,108,867 B2 | 1/2012 | Robison |
| 8,209,702 B1 | 6/2012 | Roytman et al. |
| 8,284,206 B2 | 10/2012 | State |
| 8,533,729 B2 | 9/2013 | Yao |
| 8,732,713 B2 | 5/2014 | Coon et al. |
| 8,949,853 B2 | 2/2015 | Zimmermann |
| 8,990,833 B2 | 3/2015 | Kuesel et al. |
| 9,325,575 B2 | 4/2016 | Gray |
| 2005/0188372 A1 | 8/2005 | Inoue et al. |
| 2006/0026377 A1 | 2/2006 | Sikdar et al. |
| 2007/0074207 A1* | 3/2007 | Bates .................... G06F 9/4881 718/1 |
| 2011/0310977 A1 | 12/2011 | Nishihara et al. |

OTHER PUBLICATIONS

Beni G., Wang J. (1993) Swarm Intelligence in Cellular Robotic Systems. In: Dario P., Sandini G., Aebischer P. (eds) Robots and Biological Systems: Towards a New Bionics?. NATO ASI Series (Series F: Computer and Systems Sciences), vol. 102. Springer, Berlin, Heidelberg.*

US-2008/0168318 A1 Jul. 2008 Dement, Jonathan J.; Wi-Fi Enabled Sensors for the Internet of Things: A Practical Approach; IEEE Communications Magazine—Jun. 2012, pp. 134-143.

Extended European Search Report, dated Feb. 13, 2018; 11pgs.

Kennedy, J.; "Swarm Intelligence", Zomaya, Handbook of Nature—Inspired and Innovative Computing. Springer, Boston, MA (2006), Chap. 6, 35pgs.

Ron Hipschman, "SETI@Home The Search for Extraterrestrial Intelligence", UC Berkeley SETI Project (online), 1997, Available at http://seticlassic.ssl.berkeley.edu/about_seti/about_seti_at_home_1.html.

Julia Evangelou Strait, "Computational biology project aims to better understand protein folding Crowd-sourced computer network delves into protein structure, seeks new disease therapies", The Source (online), Feb. 26, 2019, Washington University in St. Louis, Available at https://source.wustl.edu/2019/02/computational-biology-project-aims-to-better-understand-protein-folding/.

\* cited by examiner

SYSTEM AND METHOD FOR SWARM COLLABORATIVE INTELLIGENCE USING DYNAMICALLY CONFIGURABLE PROACTIVE AUTONOMOUS AGENTS

PRIORITY DATA

This application is a continuation of U.S. application Ser. No. 14/340,332, filed Jul. 24, 2014, now U.S. Pat. No. 9,852,004, issued on Dec. 26, 2017, which is a continuation of U.S. application Ser. No. 13/750,696, filed Jan. 25, 2013, now U.S. Pat. No. 9,146,777, issued on Sep. 29, 2015, which are incorporated herein by reference.

FIELD OF INVENTION

The present invention generally relates to parallel-process computing, and collaborative intelligence, and particularly relates to a processing architecture which involves autonomous co-processors (such as robotic vehicles, Internet of Things (IoT) components, and networked devices) configured to proactively retrieve tasks from a task pool populated by a central processing unit.

BACKGROUND

The Internet of Things (also referred to as the Cloud of Things) refers to an ad hoc network of uniquely identifiable embedded computing devices within the existing Internet infrastructure. In addition to or in conjunction with IoT, collaborative intelligence portends advanced connectivity of devices, systems, and robotic vehicles. The scope of things contemplated by collaborative intelligence and the IoT is unlimited, and may include devices such as heart monitoring implants, biochip transponders, automobile sensors, aerospace and defense field operation devices, unmanned ground vehicle (UGVs), unmanned aerial vehicles (UAVs), and public safety applications that assist fire-fighters in search and rescue operations, for example. Current market examples include home based networks that involve smart thermostats, light bulbs, and washer/dryers that utilize wifi for remote monitoring. Due to the ubiquitous nature of connected objects in the IoT, it is estimated that more than 30 billion devices will be wirelessly connected to the Internet of Things by 2020. Harnessing the processing capacity of the controllers and processors associated with these devices is one of the objectives of the present invention.

Computer processors traditionally execute machine coded instructions serially. To run a plurality of applications concurrently, a single processor interleaves instructions from various programs and executes them serially, although from the user's perspective the applications appear to be processed in parallel. True parallel or multi-core processing, on the other hand, is a computational approach that breaks large computational tasks into individual blocks of computations and distributes them among two or more processors. A computing architecture that uses task parallelism (parallel processing) divides a large computational requirement into discrete modules of executable code. The modules are then executed concurrently or sequentially, based on their respective priorities.

A typical multiprocessor system includes a central processing unit ("CPU") and one or more co-processors. The CPU partitions the computational requirements into tasks and distributes the tasks to co-processors. Completed threads are reported to the CPU, which continues to distribute additional threads to the co-processors as needed. Presently known multiprocessing approaches are disadvantageous in that a significant amount of CPU bandwidth is consumed by task distribution; waiting for tasks to be completed before distributing new tasks (often with dependencies on previous tasks); responding to interrupts from co-processors when a task is completed; and responding to other messages from co-processors. In addition, co-processors often remain idle while waiting for a new task from the CPU.

A multiprocessor architecture in thus needed which reduces CPU management overhead, and which also more effectively harnesses and exploits available co-processing resources.

SUMMARY OF THE INVENTION

Various embodiments of a parallel processing computing architecture include a CPU configured to populate a task pool, and one or more co-processors configured to proactively retrieve threads (tasks) from the task pool. Each co-processor notifies the task pool upon completion of a task, and pings the task pool until another task becomes available for processing. In this way, the CPU communicates directly with the task pool, and communicates indirectly with the co-processors through the task pool.

The co-processors may also be capable of acting autonomously; that is, they may interact with the task pool independently of the CPU. In a preferred embodiment, each co-processor includes an agent that interrogates the task pool to seek a task to perform. As a result, the co-processors work together "in solidarity" with one another and with the task pool to complete aggregate computational requirements by autonomously retrieving and completing individual tasks which may or may not be inter-related. By way of non-limiting example, suppose a task B involves computing an average temperature over time. By defining a task A to include capturing temperature readings over time, and further by defining task B to including obtaining the captured readings, the CPU and the various co-processors may thereby inferentially communicate with each other via the task pool.

In various embodiments the co-processors are referred to as autonomous, proactive solidarity cells. In this context, the term autonomous implies that a co-processor may interact with the task pool without being instructed to do so by the CPU or by the task pool. The term proactive suggests that each co-processor may be configured (e.g., programmed) to periodically send an agent to monitor the task pool for available tasks appropriate to that co-processor. The term solidarity implies that co-processing cells share a common objective in monitoring and executing all available tasks within the task pool.

A solidarity cell (co-processor) may be a general purpose or special purpose processor, and therefore may have the same or different instruction set, architecture, and microarchitecture as compared to the CPU and other solidarity cells in the system. Moreover, the software programs to be executed and data to be processed may be contained within one or more memory units. In a typical computer system, for example, a software program consists of a series of instructions that may require data to be used by the program. For example, if the program corresponds to a media player, then the data contained in memory may be compressed audio data which is read by a co-processor and eventually played on a speaker.

Each solidarity cell in the system may be configured to communicate, ohmically or wirelessly, with the task pool through a crossbar switch, also known as fabric. In a purely wireless mesh topology, the radio signals themselves may constitute the fabric. In various embodiments, the co-processors may also communicate directly with the CPU. The switching fabric facilitates communication among system resources. Each solidarity cell is proactive, in that it obtains a task to perform by sending its agent to the task pool when the solidarity cell has no processing to perform or, alternatively, when the solidarity cell is able to contribute processing cycles without impeding its normal operation. By way of non-limiting example, in the context of the Internet-of-Things (discussed in greater detail below), a co-processor associated with a device such as a light bulb may be programmed to listen for "on" and "off" commands from a master device (such as a smartphone) as its normal operation, but its processing resources may also be harnessed through a task pool.

In the context of various embodiments described herein, the term agent refers to a software module, analogous to a network packet, associated with a co-processor that interacts with the task pool to thereby obtain available tasks which are appropriate for that co-processor cell. The solidarity cells may execute the tasks sequentially, when the tasks are contingent on the execution of a previous task, or in parallel, when more than one solidarity cell is available and more than one matching tasks are available for execution. The tasks may be executed independently or collaboratively, depending on the task thread restrictions (if any) provided by the CPU. Interdependent tasks within the task pool may be logically combined. The task pool notifies the CPU when a task thread is completed. If a task thread is composed of a single task, then the task pool may notify the CPU at completion of such task. If a task thread is composed of multiple tasks, the task pool may notify the CPU at completion of such chain of tasks. Since task threads may be logically combined, it is conceivable to have a case in which the task pool notifies the CPU after completion of logically combined task threads.

Those skilled in the art will appreciate that interoperability among the CPU and co-processors may be facilitated by configuring the CPU to compose and/or structure tasks at a level of abstraction which is independent of the instruction set architecture associated with the various co-processors, thereby allowing the components to communicate at a task level rather than at an instruction level. As such, devices and their associated co-processors may be added to a network on a "plug and play" basis. Another aspect of this invention provides interoperability within a heterogeneous array of CPUs with different instruction set architectures.

Various features of the invention are applicable to, inter alia, a network of Internet-of-Things devices and sensors; heterogeneous computing environments; high performance computing, two dimensional and three dimensional monolithic integrated circuits; and motion control and robotics.

BRIEF DESCRIPTION OF THE DRAWINGS

The present invention will hereinafter be described in conjunction with the appended drawing figures, wherein like numerals denote like elements, and.

DETAILED DESCRIPTION

Various embodiments relate to parallel processing computing systems and environments (such as IoT and collaborative intelligence environments), ranging from simple switching and control functions to complex programs and algorithms including, without limitation: robot control, data encryption; graphics, video, and audio processing; direct memory access; mathematical computations; data mining; game algorithms; ethernet packet and other network protocol processing including construction, reception and transmission of data the outside network; financial services and business methods; search engines; internet data streaming and other web-based applications; execution of internal or external software programs; switching on and off and/or otherwise controlling or manipulating appliances, light bulbs, consumer electronics, robotic vehicles, and the like, e.g., in the context of the Internet-of-Things and/or collaborative intelligence systems.

Various features may be incorporated into any presently known or later-developed computer architecture. For example, parallel processing concerns relating to synchronization, data security, out-of-order execution, and main processor interrupts may be addressed using the inventive concepts described herein.

Figure 1:
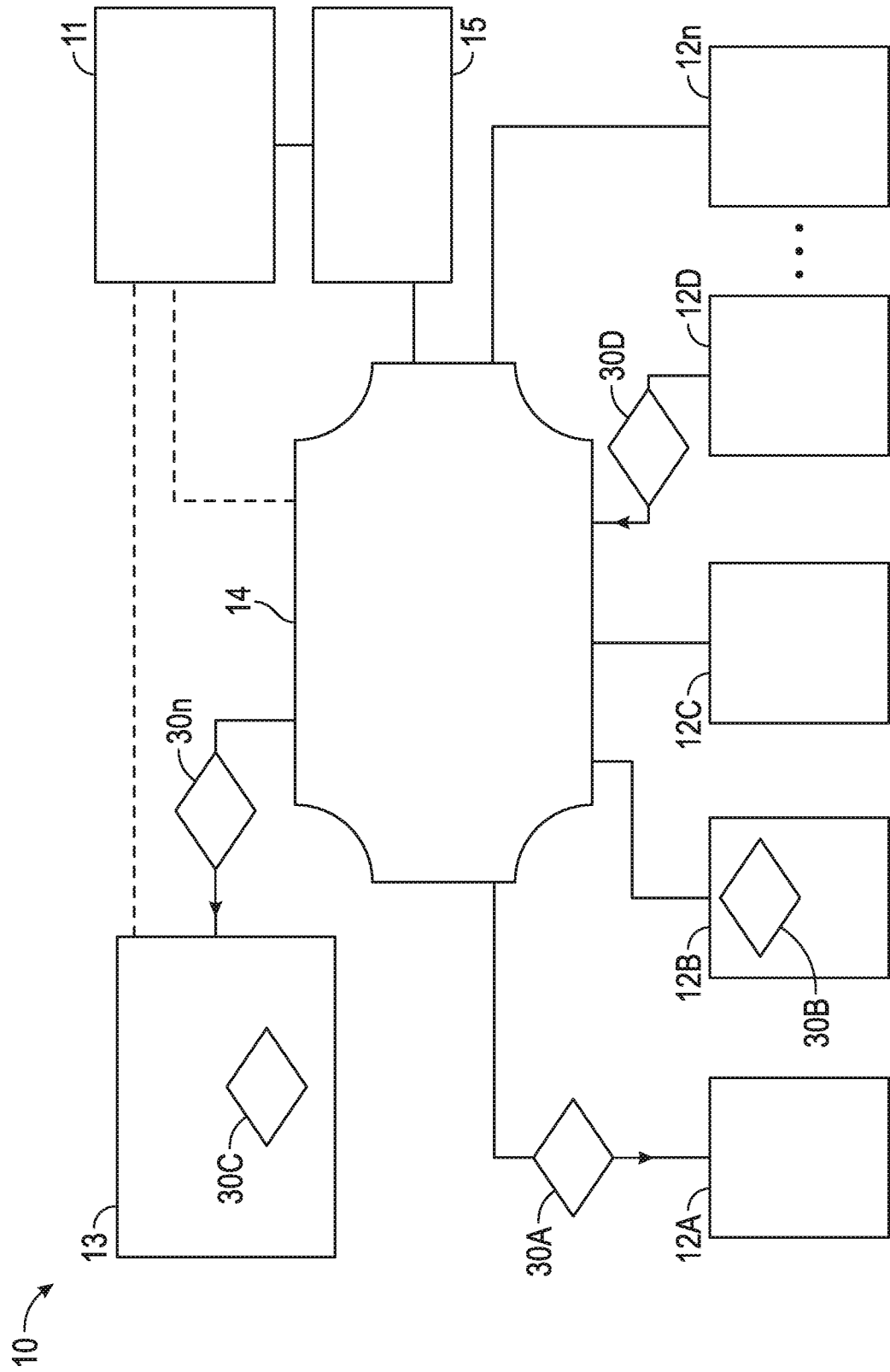
FIG. 1 is a schematic block diagram of a parallel processing architecture including a CPU, memory, task pool, and a plurality of co-processors configured to communicate through a fabric in accordance with an embodiment.

Referring now to FIG. 1, a distributed processing system 10 for use in connection with, for example, an IoT network or collaborative intelligence system includes a single or multi-core CPU 11 and one or more solidarity or co-processing cells 12A-12 configured to communicate with a task pool 13 through a cross-bar switching fabric 14. The solidarity cells 12 may also communicate with each other through the switching fabric 14 or through a separate cell bus (not shown). The CPU 11 may communicate with the task pool 13 directly or through the switching fabric 14. One or more memory units 15 each contain data and/or instructions. In this context, the term "instructions" include a software program that may be compiled for execution by the CPU 11. The memory units 15, cells 12, and the task pool 13 may be ohmically or wirelessly interconnected to communicate with the CPU and/or with each other via the switching fabric 14. In some embodiments, the CPU 11 communicates with the cells 12 only indirectly through the task pool. In other embodiments, the CPU 11 may also communicate directly with the cells 12 without using the task pool as an intermediary.

In some embodiments the system 10 may include more than one CPU 11 and more than one task pools 13, in which case a particular CPU 11 may interact exclusively with a particular task pool 13, or multiple CPUs 11 may share one or more task pools 13. Moreover, each solidarity cell may be configured to interact with more than one task pool 13.

Alternatively, a particular cell may be configured to interact with a single designated task pool, for example, in a high performance or high security context.

In various embodiments cells may be dynamically paired, ohmically (plug and play) or wirelessly (on the fly), with a task pool when the following three conditions are meet:
1) The cell is able to communicate, ohmically or wirelessly, with the task pool. The connection to the task pool can be through a port in the task pool itself, or through a switching fabric that is connected to the task pool;
2) The task pool recognizes the agent sent by the cell as trustworthy, for example, using input from the user, with or without password, through traditional Wi-Fi, Bluetooth or similar pairing, manually through a graphical software program running on a smartphone or tablet, or by any other secure or unsecure method; and
3) At least one of the available tasks within the task pool is compatible with the capabilities of the solidarity cell.

In the case of a multi-processor environment with multiple task pools, the foregoing dynamic pairing conditions apply, except that a given cell may be locked or restricted to work with only one of the task pools; otherwise, the cells may connect with one or more task pools, using a first found basis, round robin basis or any other selection scheme. It is also possible to assign priorities to the tasks within the task pools, whereby the cells give preference to the high priority tasks and serve the lower priority tasks when not otherwise engaged by the higher priority tasks.

The CPU 11 may be any single or multi-core processor, applications processor or microcontroller, used to execute a software program. The system 10 may be implemented on a personal computer, smart phone, tablet, or Internet-of-Things device, in which case the CPU 11 may be any personal computer, central processor, or processor cluster, such as an Intel® Pentium® or multi-core processor local to or remote from the immediate computing environment. Alternatively, the system 10 may be implemented on a supercomputer and the CPU 11 may be a reduced instruction set computer ("RISC") processor, applications processor, a microcontroller, or the like.

In other embodiments, the system 10 may be implemented on a locally connected series of personal computers, such as a Beowulf cluster, in which case the CPU 11 may include the central processors of all, a subset, or one of the networked computers. Alternatively, the system 10 may be implemented on a network of remotely connected computers, in which case the CPU 11 may be a presently known or later developed central processor for a server or mainframe. The particular manner in which the CPU 11 performs the subject parallel processing methods within the presently described system 10 may be influenced by the CPU's operating system. For example, the CPU 11 may be configured for use within the system 10 by programming it to recognize and communicate with the task pool 13 and divide the computing requirements into threads, as described below.

It is further contemplated that the system 10 may be implemented retroactively on any computer or computer network having an operating system that may be modified or otherwise configured to implement the functionality described herein. As is known in the art, the data to be processed is contained within the memory units 15, for example in the context of addressable regions or sectors of random access or read-only memory, cache memory for the CPU 11, or other forms of data storage such as flash memory and magnetic storage. The memory units 15 contain the data to be processed as well as the location to place the results of the processed data. Not every task is required to access the memory units 15, as in the case of, for example, smart meters and automotive instrumentation, which may return data to the system 10, or as in the case of a robot and motor controllers which may actuate a mechanism.

Each cell 12 is a conceptually or logically independent computational unit capable of executing one or more tasks/threads. A cell 12 may be a microcontroller, a microprocessor, application processor, a "dumb" switch, or a standalone computer such as a machine in a Beowulf cluster.

A cell 12 may be a general or special purpose co-processor configured to supplement, perform all of, or perform a limited range of functions of the CPU, or functions that are foreign to the CPU 11 such as ambient monitoring and robotic actuators, for example. A special-purpose processor may be a dedicated hardware module designed, programmed, or otherwise configured to perform a specialized task, or it may be a general-purpose processor configured to perform specialized tasks such as graphics processing, floating-point arithmetic, or data encryption.

In an embodiment, any cell 12 that is a special-purpose processor may also be configured to access and write to memory and execute descriptors, as described below, as well as other software programs.

Moreover, any number of cells 12 may comprise a heterogeneous computing environment; that is, a system that uses more than one kind of processor such as an AMD-based and/or an Intel-based processor, or a mixture of 32-bit and 64-bit processors.

Each cell 12 configured to perform one or a plurality of specialized tasks, as illustrated in the following sequence of events. During a poll phase each cell periodically sends an agent to the task pool until a matching task is found. To facilitate this matching, both the cell and the task pool may be equipped with a transceiver. In the case of the task pool, the transceiver maybe located in the task pool itself or in the switching fabric to which the task pool is connected. When a task match is found within a task pool, the task pool transmits an acknowledgement to the cell. The next step is the "communication channel" phase. During the communication channel phase, the cell receives the task and begins to execute the task. In one implementation, once the first task is completed, the communication channel is maintained so that the solidary cell can fetch another task without having to repeat the "poll" and "acknowledge" phases.

The system 10 may include a plurality of cells, wherein some of the cells are capable of performing the same task types as other cells, to thereby create redundancy in the system 10. The set of task types performed by a given cell 12 may be a subset of the set of task types performed by another cell. For example, in FIG. 1, the system 10 may divides an aggregate computational problem into a group of tasks, and populate the task pool 13 with a first type, a second type, and a third type of tasks. A first cell 12A may capable of performing only tasks of the first type; a second cell 12B may be capable of perform tasks of the second type; a third cell 12C may be capable of performing tasks of the third type; a fourth cell 12D may be capable of performing tasks of the second or third types; and a fifth cell 12N may be capable of performing all three task types. The system 10 may be configured with this redundancy so that if a given cell is removed from the system 10 (or currently busy or otherwise unavailable), the system 10 may continue to function seamlessly. Furthermore, if a cell is dynamically added to the system 10, the system 10 may continue to function seamlessly with the benefit of increased performance.

Figure 2:
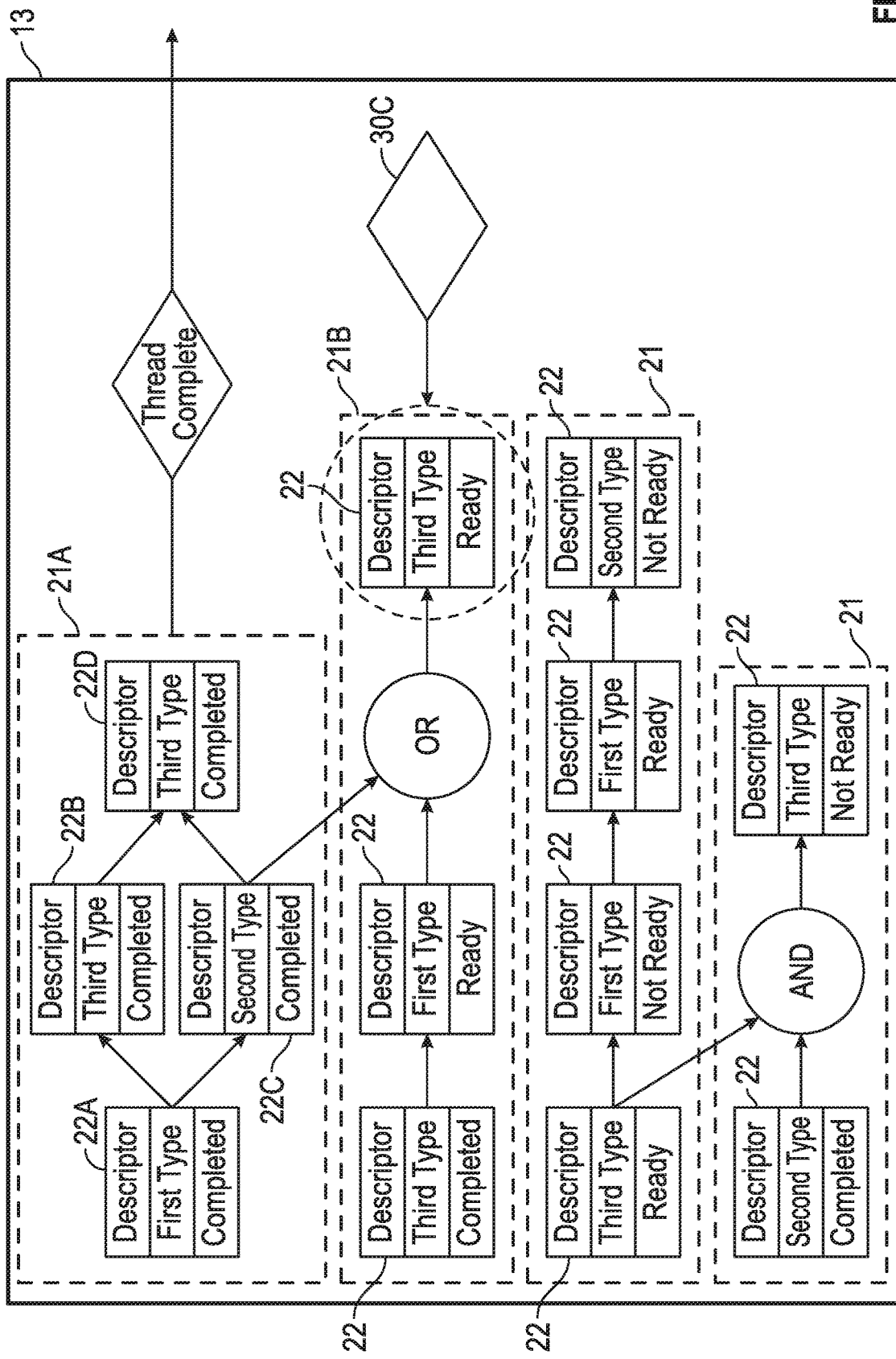
FIG. 2 is a schematic block diagram illustrating details of an exemplary task pool in accordance with an embodiment.

Referring now to FIGS. 1 and 2, the task pool 13 may occupy a region of physical memory that is accessible by the CPU 11. Alternatively, the task pool 13 may be accessible by MAC address or IP address. Multiple embodiments are envisioned for the task pool 13; it may be physically located with the CPU in the same 2D or 3D monolithic IC, or it may be implemented as a stand-alone IC and be physically interconnected to a computer board, smart phone, tablet, router or Internet-of-Things device. In a further alternative embodiment, the task pool may be a stand-alone multi-port, wired and/or wireless connected device which may be shared among multiple CPU 11 systems, or dedicated to a given CPU 11. The task pool 13 may also be addressable by the cells 12. The task pool 13 may be disposed in a dedicated hardware block to provide maximum access speed by the CPU 11 and cells 12. Alternatively, the task pool 13 may be software based, wherein the contents of the task pool 13 are stored in memory, analogous to the hardware-based embodiment, but represented by data structures.

Upon being populated by the CPU 11, the task pool 13 contains one or more task threads 21. Each task thread 21 represents a computational task that may be a component or subset of the larger aggregate computational requirement imposed on the CPU 11. In one embodiment, the CPU 11 may initialize and then populate the task pool 13 with concurrently executable threads 21. Each thread 21 may include one or more discrete tasks 22. A task 22 may have a task type and a descriptor. The task type indicates which cells 12 are capable of performing the task 22. The task pool 13 may also use the task type to prioritize tasks 22 having the same type. In one embodiment, the task pool 13 may maintain a prioritization table (not shown) that documents the solidarity cells 12 present in the system 10, the types of tasks 22 each cell is capable of performing, and whether or not each cell is presently processing a task 22. The task pool 13 may use the prioritization table to determine which of the eligible tasks 22 to assign to a requesting cell, as described below.

In some embodiments, the CPU 11 may retrieve and execute a task or thread from the task pool. Moreover, the CPU 11 may abort any task that is determined to be stale, broken, stuck, or erroneous. In such case, the CPU 11 may refresh the task, making available for subsequent processing. Nothing precludes the CPU 11 from implementing adaptive task management, for example, as may be required by Artificial Intelligence, whereupon the CPU 11 may add, remove, or change tasks within an unfinished existing thread 21.

The descriptor may contain one or more of a specific instruction to be executed, a mode of execution, the location (e.g., address) of the data to be processed, and the location for placement of the task results, if any. The location for placement of results is optional, such as in the case of animation and multimedia tasks that often present results to a display rather than storing them in memory. Moreover, task descriptors may be chained together, as in a linked list, so that the data to be processed may be accessed with fewer memory calls than if the descriptors were not chained together. In an embodiment, the descriptor is a data structure containing a header and a plurality of reference pointers to memory locations, and the task 22 includes the memory address of the data structure. The header defines the function or instruction to be executed. A first pointer references the location of the data to be processed. A second, optional pointer, references the location for placement of processed data. If the descriptor is linked to another descriptor to be sequentially executed, the descriptor may include a third pointer that references the next descriptor. In an alternative embodiment where the descriptor is a data structure, the task 22 may include the full data structure.

A thread 21 may further comprise a "recipe" describing the order in which the tasks 22 may be performed and any conditions that affect the order of performance. According to the recipe, the tasks 22 may be executed sequentially, concurrently, out-of order, interdependently, or conditionally according to Boolean operations. For example, in FIG. 2, thread 21A comprises four tasks: 22A, 22B, 22C, and 22D. In the illustrated embodiment, the first task 22A must be completed before either the second task 22B or the third task 22C can begin. According to the recipe, once either the second task 22B or third task 22C is complete, the fourth task 22D may begin.

Threads 21 may also be interdependent. For example, as shown in FIG. 2, due to the Boolean operation in thread 21B, a completed task 22C may allow processing of tasks in thread 21B to continue. The task pool 13 may lock a task 22 while the task 22 is waiting for completion of another task 22 upon which it depends. When a task 22 is locked, it cannot be acquired by a cell. When the tasks 22 of a thread 21 are completed, the task pool 13 may notify the CPU 11 of the completion. The CPU may then advance processing beyond the completed thread 21.

The cells advantageously maintain solidarity with each other and with the CPU 11, thereby helping the system 10 to perform complex computations by autonomously and proactively retrieving tasks from the task pool 13. The cells 12 act autonomously in that they may act independently of the CPU 11 or any other coprocessor. Alternatively, a cell may be acted upon or instructed directly by the CPU. Each cell acts proactively in that it seeks a task 22 from the task pool 13 as soon as the cell becomes available for further processing.

More particularly, in an embodiment, a cell 12 acquires a task from the task pool by sending an agent 30 to interrogate (search for) the task pool and retrieve an available task 22 that requires completion, is not locked, and that has a task type that can be performed by the cell. Typically, the system 10 has the same number of agents as solidarity co-processing cells. In this context, an agent is generally analogous to a data frame in the networking sense, in that an agent may be equipped with a source address, a destination address, and a payload. In an embodiment, the destination address is the address of the task pool 13 when the agent 30 is seeking a task 22, and the destination address is the address of the corresponding cell 12 when the agent 30 is returning to its cell with a task 22. Correspondingly, the source address is the address of the cell 12 when the agent 30 is seeking a task 22, and the source address is the address of the task pool 13 when the agent 30 is returning to its cell with a task 22.

In addition, the source and destination addresses may facilitate frame synchronization. That is, the system 10 may be configured to unequivocally differentiate addresses from payload data, so that when the contents of an agent 30 are read, the destination address indicates the beginning of the frame and the source address indicates the end of the frame, or vice versa. This allows the payload to vary in size when it is placed between the addresses. In another embodiment of a variable-size payload, an agent 30 may include a header that indicates the payload size. The header information may be compared to the payload to verify the data integrity. In still another embodiment, the payload may be a fixed length.

When an agent 30 is dispatched to the task pool 13 by its co-processor cell, the payload contains identifying information of the types of tasks the cell 12 can perform. When the agent 30 returns from the task pool 13, the payload contains the descriptor of the task 22, either in the form of a memory location or the full descriptor data structure.

In other embodiments, some or all of the agents 30 are autonomous representatives of their respective corresponding cells 12. That is, each agent 30 may be dispatched by its corresponding cell 12 to retrieve a task 22 any time the cell is idle or capable of performing additional processing. In this way, the processing capacity of the solidarity cells 12 may be more fully exploited, inasmuch as the cells need not wait idly for an instruction from the CPU 11. This approach has the additional benefit of reducing CPU overhead by relieving the CPU of the need to send a request to a cell to retrieve a task from the task pool. These advantages render the system 10 more efficient than traditional computer architectures in which auxiliary modules and co-processors are dependent on instructions from the main CPU.

Further, the solidarity cells 12A-12n are ambivalent as to the particular composition of the thread itself. Rather, an agent is only concerned about finding a match between the capabilities of its corresponding cell and an available task 22 to be completed in the task pool 13. That is, as long as there are available tasks 22 in the task pool 13, and an available task 22 matches the capability of the cell, then the system may effectively harness the processing capacity of the cell.

Some or all of the solidarity cells 12A-12n may work independently of each other, or may communicate with each other directly, through the switching fabric 14, through the task pool 13, or pursuant to a command or request from the CPU to invoke another solidarity cell to assist in processing, moving, or transmitting data. In one embodiment, the agent 30A may search for a match between the task type of the ready tasks 22 and the types of tasks that the cell 12A is able to perform. This architecture may involve hard-coding of the types of tasks that the CPU 11 is configured to create. Thus, if the task pool 13 contains three types of tasks 22, and the large computational requirement includes a task of a fourth type, this fourth type of task may not be placed in the task pool 13 even if a cell capable of performing tasks of the fourth type is included in or added to the system 10. Consequently, the CPU 11 may be configured to "learn" or be taught how to create tasks of the fourth type in order to more fully exploit the available processing resources.

In another embodiment, the agent 30A searches the task 22 descriptors for an executable instruction that matches one of the instructions that that cell 12A is capable of executing. When a matching task 22 is found, the agent 30A delivers the descriptor of the matching task 22 to the cell 12A, whereupon the cell 12A begins to process the task 22. In particular, the agent 30A may deliver the memory address of the descriptor to the cell 12A, and the cell 12A retrieves the data structure from memory. Alternatively, where the descriptor's entire data structure is contained in the task 22, the agent 30A may deliver the complete data structure to the cell 12A for processing. The descriptor informs the cell 12A which instruction to execute, the location in memory units 15 where the data to be processed may be found, and the location in memory 15 where the results are to be placed. Upon completion of the task 22, the cell 12A notifies the task pool 13 to change the status of the selected task 22 from 'to be completed' to 'completed.' Further, once the cell 12A finishes a task 22, the cell may dispatch its agent 30A to the task pool 13 to seek another task 22.

Some or all of the agents 30A-30n may travel through the system 10 by wire or wirelessly, for example, using a Wi-Fi network, wireless Ethernet, wireless USB, wireless bridge, wireless repeater, wireless router, Zigbee®, ANT+® or Bluetooth® pairing, according to the particular architecture and/or implementation of the system 10. In an embodiment, an agent 30 may be guided to the task pool 13 wirelessly by including a receptor feature at the task pool 13 and further by including a transmitter feature with the cell 12. Similarly, the task pool may answer wirelessly to the cells by equipping the task pool with a transmitter and the solidarity cells with a receiver. In this manner, the cells may communicate wirelessly with the task pool with or without use of the switching fabric.

In a preferred embodiment, however, some form of switching fabric 14 is used. The switching fabric 14 facilitates connections for data transfer and arbitration between system resources. The switching fabric 14 may be a router or crossbar switch that provides connectivity between the various cells and the task pool. The switching fabric 14 may further provide connectivity between each solidarity cell 12A-12n and system resources such as the CPU 11, memory units 15, and traditional system components including, without limitation: direct memory access units, transmitters, hard disks and their controllers, display and other input/output devices, and other coprocessors. The cells 12A-12n may be connected physically to the switching fabric 14, or the cells may be connected wirelessly.

The wireless connection of cells into the system 10 facilitates the dynamic addition and/or removal of cells for use in the system 10. For example, the CPU 11 may recruit cells from other cell systems, allowing for dynamic expansion and increased performance. In this manner, two or more cell systems (e.g., networks) may share solidarity cells. In one embodiment, a cell that becomes idle may look for and/or be recruited by another system that has a need for additional processing resources, i.e., it has available processing tasks that need to be completed. Similarly, the system 10 may expand performance by incorporating clusters of additional cells for a particular task. For example, the system 10 may enhance performance of an encryption/decryption function, or the processing of audio and/or video data, by incorporating nearby cells capable of performing these tasks.

To guard against undesirable connections, the CPU 11 may provide the task pool 13 with a list of or, alternatively, criteria for identifying trusted and/or untrusted cells as well as authentication requirements or protocols. Moreover, the task pool itself may exclude particular cells on the basis of low performance, unreliable connection, poor data throughput, or suspicion of malicious or otherwise inappropriate activity. In various embodiments, cells 12 may be added to a task pool 13, or excluded from a task pool 13, by a user through the use of a smartphone, tablet or other device or application. In one embodiment, a graphical application interface may provide the user with useful statistical and/or iconic information such as location of available cells and other devices, performance gain, or performance penalty, as a result of adding or removing particular cells from a network.

In an alternative embodiment, some or all of the co-processing cells may connect directly to the task pool 13, such as by a wired configuration that does not require a switching fabric 14 for communication. The wired connection of cells may further facilitate dynamic expansion and contraction of the system 10 analogous to the wireless configuration discussed above, although wired connections may physical (e.g., manual) integration and extraction of peripheral devices. In either case, scalability of the system is greatly enhanced over conventional parallel processing schemes, as co-processors may be added and removed without reprogramming the CPU 11 to account for the changes to the system 10.

Figure 3:
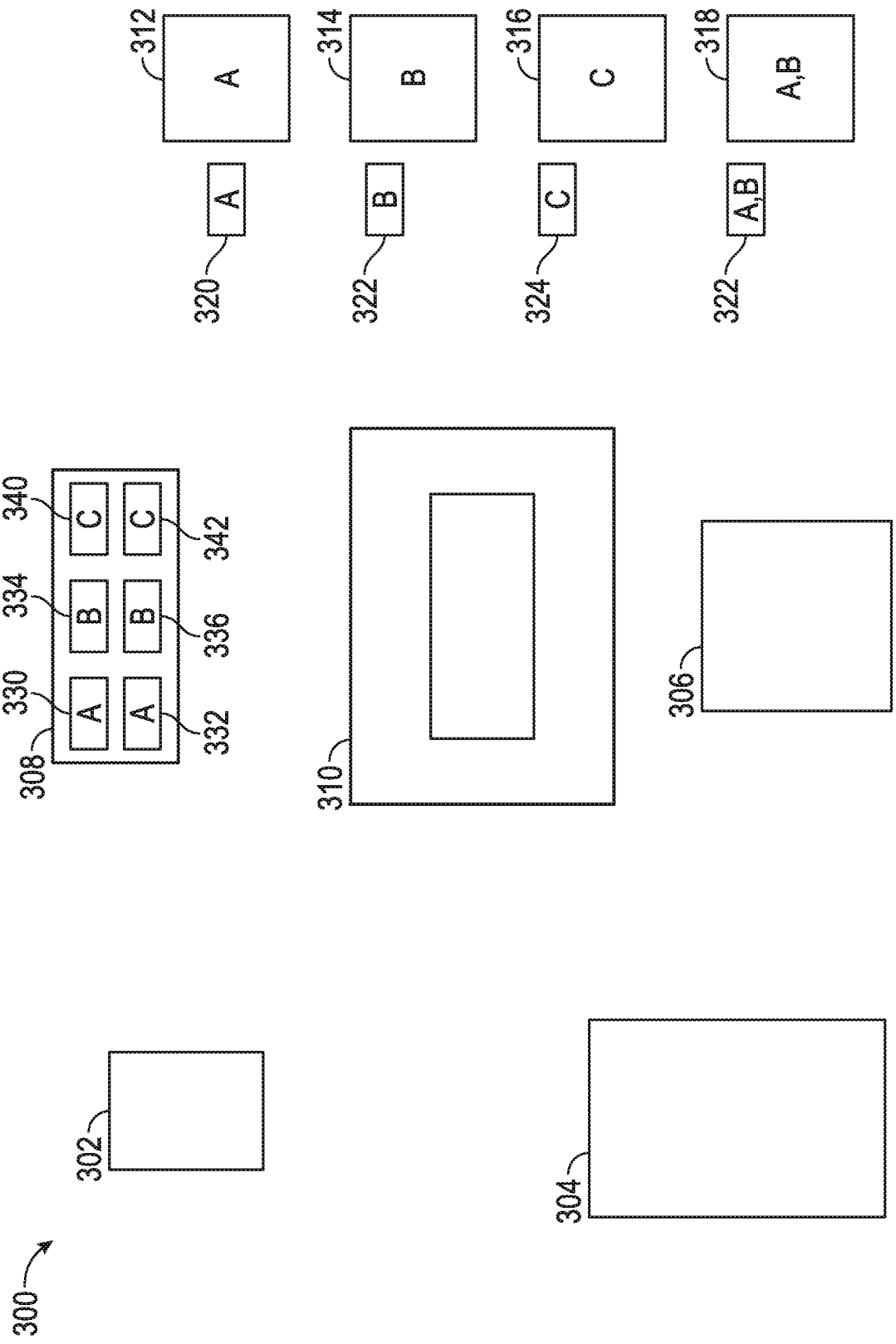
FIG. 3 is a schematic block diagram of a network including co-processing cells and their corresponding agents interacting with a task pool in accordance with an embodiment.

Referring now to FIG. 3, a network 300 includes a CPU 302, a first memory 304, a second memory 306, a task pool 308, a switching fabric 310, a first co-processing cell 312 configured to perform (execute) type A tasks, a second cell 314 configured to perform type B tasks, a third cell 316 configured to perform type C tasks, and a fourth cell 318 configured to perform both type A and type B tasks. As shown, the task pool 308 is populated (e.g., by the CPU 302) with tasks (or task threads) 330 and 332 of task type A; tasks 334 and 336 of task type B; and tasks 340 and 342 of task type C. In an embodiment, each cell preferably has a unique, dedicated agent. In particular, cell 312 includes an agent 320; cell 314 includes an agent 322; cell 316 includes an agent 324; and cell 318 includes an agent 326. Each agent preferably includes an information field or header which identifies the type of tasks its associated cell is configured to perform, for example, a single task or combination of tasks A, B, C.

During operation, when a cell is either idle or otherwise has available processing capacity, its agent proactively interrogates the task pool to determine whether any tasks are in the task queue which are appropriate for that particular cell. For example, cell 312 may dispatch its agent 320 to retrieve one or both of tasks 330 and 332 corresponding to task type A. Similarly, cell 314 may dispatch its agent 322 to retrieve either task 334 or 336 (depending on their relative priorities) corresponding to task type B, and so on. For cells which are capable of performing more than one task type, such as cell 318 configured to perform task types A and B, agent 326 may retrieve any one of tasks 330, 332, 334, and/or 336.

Upon retrieving a task from the task pool, a cell may then process that task, typically by retrieving data from a particular location in first memory 304, processing that data, and storing the processed data at a particular location within second memory 306. When a task is completed, the cell notifies the task pool, the task pool marks the task as completed, and the task pool notifies the CPU that the task is completed. Alternatively, the task pool may notify the CPU when a task thread is completed, inasmuch as a task thread may comprise a single task, a series of tasks, or Boolean combination of tasks. Significantly, the retrieval of tasks and the processing of data by the cells may occur without direct communication between the CPU and the various cells.

Figure 4:
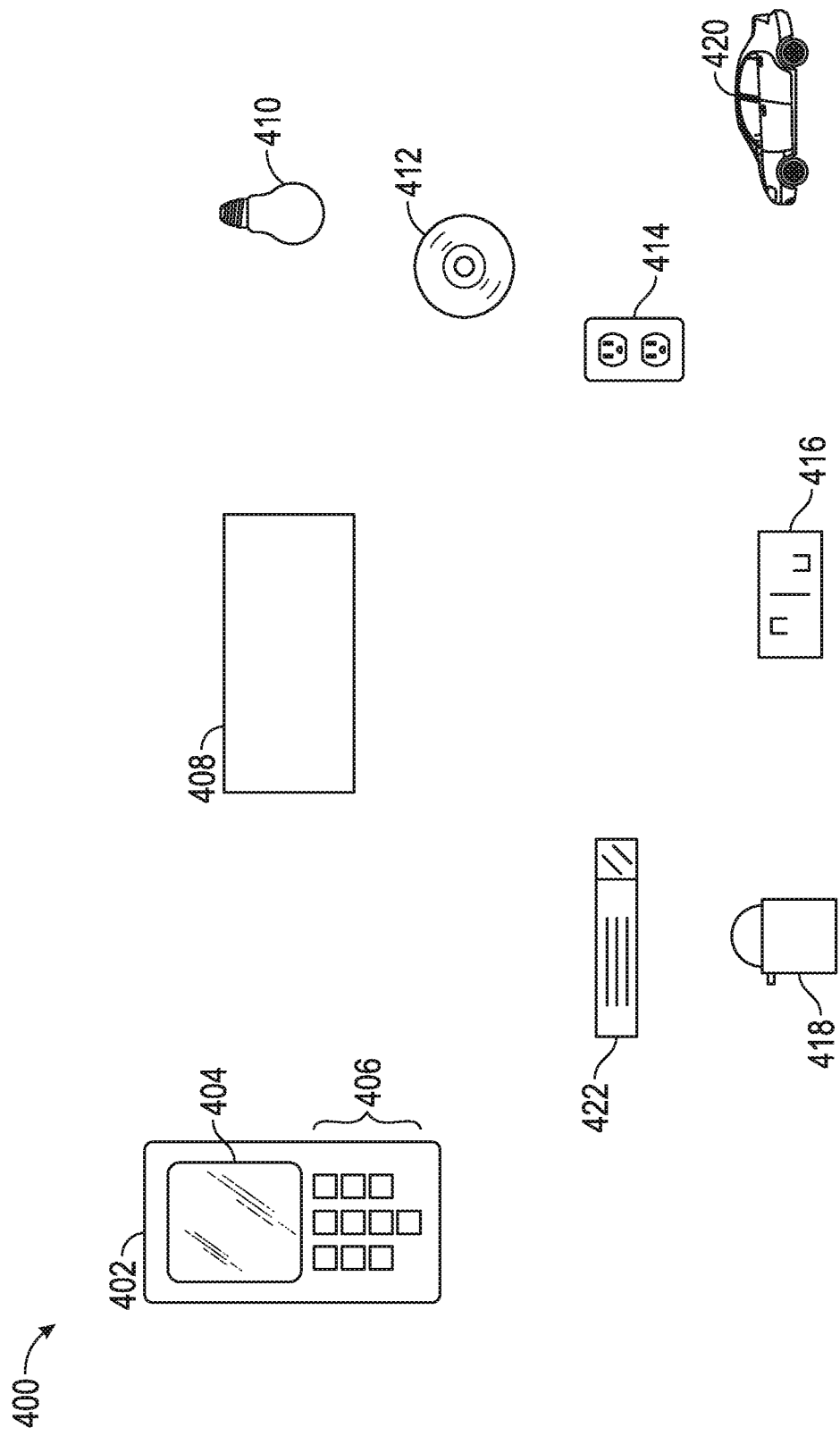
FIG. 4 is a schematic layout of an internet of things network including available plug and play devices in accordance with an embodiment.

Referring now to FIG. 4, an internet of things network 400 includes a controller (CPU) 402, a task pool 408, and various devices 410-422, some or all of which include an associated or embedded microcontroller, such as an integrated circuit (IC) chip or other component which embodies processing capacity. By way of non-limiting example, the devices may include a light bulb 410, a thermostat 412, an electrical receptacle 414, a power switch 416, an appliance (e.g., toaster) 418, a vehicle 420, a keyboard 422, and virtually any other plug and play device or application capable of interfacing with a network.

In the illustrated embodiment, the controller 402 may be a smartphone, tablet, laptop, or other device which may include a display 404 and a user interface (e.g., keypad) 406 for facilitating user interaction with the various devices on the network. To the extent the processing capacity (e.g., bandwidth) of the controller 402 may be insufficient to adequately support the network, the controller may effectively harvest or recruit processing resources from the peripheral devices via the task pool, for example as explained below in conjunction with FIG. 5.

Figure 5:
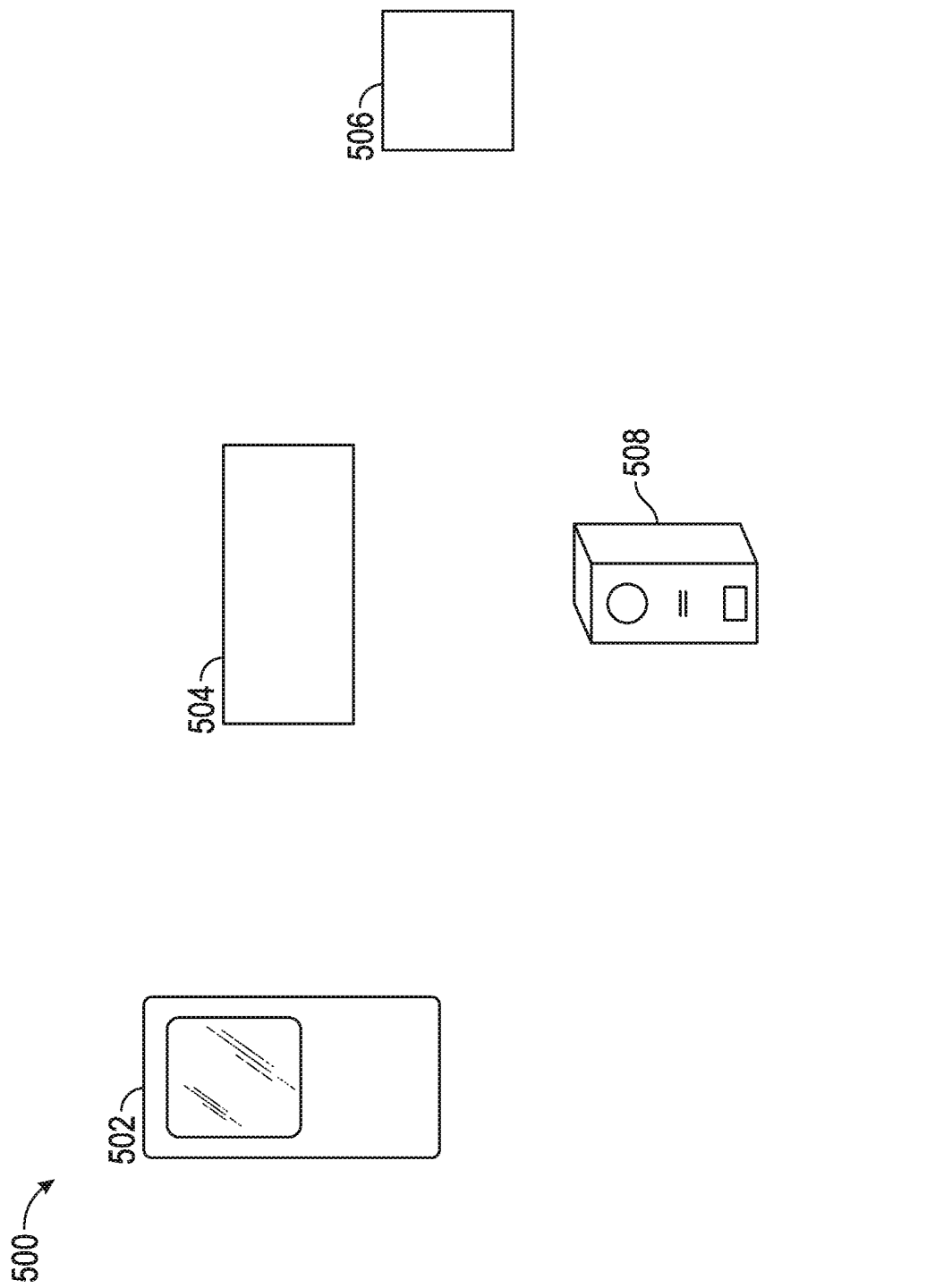
FIG. 5 is a schematic layout diagram of an exemplary internet of things use case illustrating dynamic harnessing of nearby devices in accordance with an embodiment.

Referring now to FIG. 5, an internet of things network 500 use case illustrates the dynamic harnessing of nearby (or otherwise available) devices. Network 500 includes a primary control unit 502 (e.g., a laptop, tablet, or gaming device), a task pool 504, a first co-processor device 506, and a second co-processor device 508. An exemplary use case in the context of network 500 will now be described.

Suppose a user is playing a video game on her laptop computer 502. The video game requires detailed computer-generated imagery, and perhaps the processing power in laptop 502 is sufficient to render a single realistic-looking character, but when a second character is introduced onto the screen, the image quality degrades, and the movement of the characters is no longer continuous. The present invention proposes a method to harness the processing power of underutilized computer resources located within the vicinity of, or otherwise available to, the user.

To address the need for additional processing power, the laptop 502 connects to the task pool 504. In this regard, the laptop itself may be equipped with a task pool, or the task pool may be in the form an external device or application located within wireless reach from the laptop 502. In the case of an external task pool, the task pool itself could perform the duties of a switching fabric with ports to allow connection to multiple co-processing cells. The laptop 502 populates the task pool 504 with computationally intensive tasks. A nearby underutilized device, such as a smartphone 508, subsequently connects to the task pool 504 and sends its agent to fetch a matching task type. Consequently, the smart phone 508 becomes a co-processor seamlessly assisting the laptop 502, thereby enhancing the video game experience. The same method may be repeated in the event other underutilized processing resources exist and are needed. Indeed, even the processing power of an available light-bulb 506 may become a co-processor to the laptop.

Figure 6:
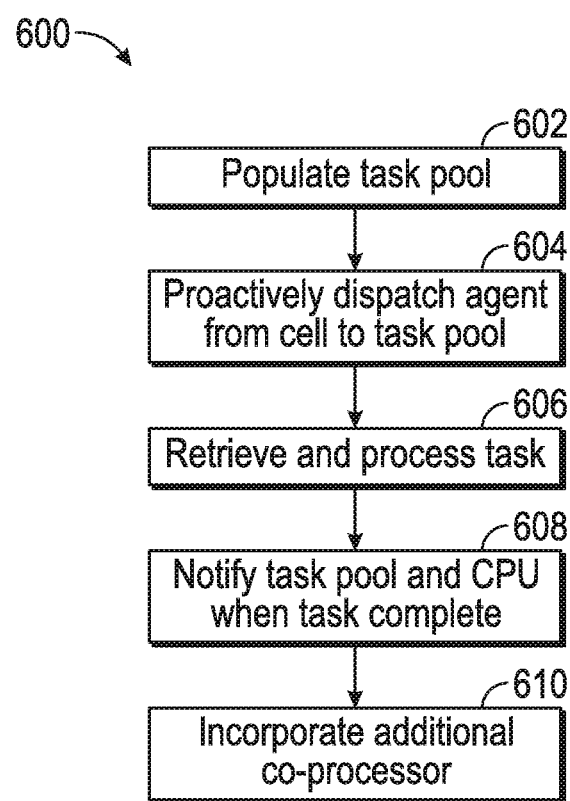
FIG. 6 is a flow chart illustrating the operation of an exemplary parallel computing environment in accordance with an embodiment.

FIG. 6 is a flow chart illustrating the operation of an exemplary parallel computing environment. In particular, a method 600 includes populating a task pool with tasks (Step 602), proactively dispatching one or more agents from one or more corresponding cells to the task pool (Step 604), retrieving and processing a task (Step 606), and notifying the task pool and the CPU that the task thread has been performed (Step 608). The method 600 further includes dynamically incorporating (Step 610) an additional device into the network, as needed.

A processing system is thus provided which includes a task pool, a controller configured to populate the task pool with a first task, and a first co-processor configured to proactively retrieve the first task from the task pool.

In an embodiment, the first co-processor comprises a first agent configured to retrieve the first task from the task pool without communicating with the controller.

In an embodiment, the first task includes indicia of a first task type, the first co-processor is configured to perform tasks of the first type, and the first agent is configured to search the task pool for a task of the first type.

In an embodiment, the first co-processor is further configured to process the first and notify the task pool upon completion of the first task, and the task pool is configured to notify the controller upon completion of the first task.

In an embodiment, the controller and the first co-processor are configured communicate with each other only through the task pool.

In an embodiment, the controller and the first co-processor are configured communicate with each other directly and through the task pool.

In an embodiment, the first co-processor is configured to determine that it has available processing capacity, and to dispatch the agent to the task pool in response to the determination.

In an embodiment, the controller is further configured to populate the task pool with a second task, and wherein the system further comprises a second co-processor having a second agent configured to proactively retrieve the second task from the task pool.

In an embodiment, the second task includes indicia of a second task type, the second co-processor is configured to perform tasks of the second type, and the second agent is configured to search the task pool for a task of the second type.

In an embodiment, the controller and the task pool reside on a monolithic integrated circuit (IC), and the first co-processor does not reside on the IC.

In another embodiment, the controller, the task pool, and the first and second co-processors reside on a monolithic integrated circuit (IC).

A method is also provided for dynamically controlling processing resources in a network of the type including a central processing unit (CPU) configured to populate a task pool with a first task having a first task type. The method includes the steps of: programming a first cell to perform the first task type; adding the programmed first cell to the network; proactively sending a first agent from the first cell to the task pool; searching the task pool, by the first agent, for a task of the first type; retrieving, by the first agent, the first task from the task pool; transporting, by the first agent, the first task to the first cell; processing, by the first cell, the first task; and sending a notification from the first cell to the task pool that the first task is completed.

In an embodiment, the method also includes: marking, by the task pool, the first task as being completed; and sending a notification from the task pool to the CPU that the first task is completed.

In an embodiment, the method also includes configuring the first cell to determine that the first cell has available processing capacity as a predicate to proactively sending the first agent to the task pool.

In an embodiment, the method also includes integrating the first cell into a first device prior to adding the programmed first cell to the network.

In an embodiment, the first device comprises one of a sensor, light bulb, power switch, appliance, biometric device, medical device, diagnostic device, lap top, tablet, smartphone, motor controller, and a security device.

In an embodiment, adding the programmed first cell to the network comprises establishing a communication link between the first cell and the task pool.

In an embodiment, the (CPU) is further configured to populate the task pool with a second task having a second task type, the method further comprising the steps of: programming the second cell to perform the second task type; establishing a communication link between the second cell and the task pool; proactively sending a second agent from the second cell to the task pool; searching the task pool, by the second agent, for a task of the second type; retrieving, by the second agent, the second task from the task pool; transporting, by the second agent, the second task to the second cell; processing, by the second cell, the second task; sending a notification from the second cell to the task pool that the second task is completed; marking, by the task pool, the second task as being completed; and sending a notification from the task pool to the CPU that the second task is completed.

A system is also provided for controlling distributed processing resources in an internet of things (IoT) computing environment, including: a CPU configured to partition an aggregate computing requirement into a plurality of tasks and place the tasks in a pool; and a plurality of devices each having a unique dedicated agent configured to proactively retrieve a task from the pool without direct communication with the CPU.

While there has been illustrated an enabling description of various embodiments including the best mode known to the inventors, it will be understood by those skilled in the art that various changes and modifications may be made and equivalents may be substituted for various elements without departing from the scope of the invention. Therefore, it is intended that the inventions disclosed herein not be limited to the particular embodiments disclosed, but that the invention will include all embodiments falling within the literal and equivalent scope of the appended claims.

I claim:

1. A collaborative intelligence system, comprising:
   a task pool;
   a controller configured to populate the task pool with a plurality of first tasks and a plurality of second tasks;
   a first co-processor configured to successively: proactively retrieve a first task from the task pool; process the first task; generate first resulting data; and update the task pool to reflect completion of the first task, all without any communication between the first co-processor and the controller; and
   a second co-processor configured to successively: proactively retrieve a second task from the task pool; process the second task; generate second resulting data; and update the task pool to reflect completion of the second task, all without any communication between the second co-processor and the controller;
   wherein the collaborative intelligence system is configured to dynamically accept the first co-processor, the second co-processor, and an additional co-processor into the processing system on a plug-and-play basis without any communication with the controller;
   the plurality of first tasks and the plurality of second tasks are associated with a common objective;
   the first and second co-processors autonomously work together in solidarity with the task pool to complete the common objective.

2. The collaborative intelligence system of claim 1, wherein the first co-processor is configured to perform at least one of depositing a new task into the task pool and modifying an existing task within the task pool.

3. The collaborative intelligence system of claim 1, wherein:
   the first co-processor includes a first agent;
   the second co-processor includes a second agent;
   the first task includes indicia of a first task type, the first co-processor is configured to perform tasks of the first type, and the first agent is configured to search the task pool for a task of the first type; and
   the second task includes indicia of a second task type, the second co-processor is configured to perform tasks of the second type, and the second agent is configured to search the task pool for a task of the second type.

4. The collaborative intelligence system of claim 1, wherein the first co-processor is configured to determine when it has available processing capacity, and to dispatch the first agent to the task pool in response to the determination.

5. The collaborative intelligence system of claim 1, wherein the controller and the task pool reside on a monolithic integrated circuit (IC) that is not a component of either the first or second co-processors.

6. A collaborative intelligence system, comprising:
a task pool;
a controller configured to populate the task pool with a plurality of first tasks and a plurality of second tasks;
a first co-processor configured to successively: proactively retrieve a first task from the task pool; deliver the first task to the first co-processor; process the first task; generate first resulting data; and update the task pool to reflect completion of the first task, all without any communication between the first co-processor and the controller; and
a second co-processor including a second agent comprising a second source address, a second destination address, and a second payload, the second co-processor configured to successively: proactively retrieve a second task from the task pool; process the second task; generate second resulting data; and update the task pool to reflect completion of the second task, all without any communication between the second co-processor and the controller;
wherein:
the processing system is configured to dynamically accept the first co-processor, the second co-processor, and an additional co-processor into the collaborative intelligence system on a plug-and-play basis without any communication with the controller;
the first co-processor includes a first agent comprising a first source address, a first destination address, and a first payload;
the second co-processor includes a second agent comprising a second source address, a second destination address, and a second payload;
the first task includes indicia of a first task type, the first co-processor is configured to perform tasks of the first type, and the first agent is configured to search the task pool for a task of the first type;
the second task includes indicia of a second task type, the second co-processor is configured to perform tasks of the second type, and the second agent is configured to search the task pool for a task of the second type;
further wherein:
when the first agent is retrieving the first task from the task pool, the first source address corresponds to an address associated with the first co-processor, the first destination address corresponds to an address associated with the task pool, and the first payload includes a first function which the first co-processor is configured to perform;
when the first agent is returning from the task pool, the first source address is the task pool's address, the first destination address is the first co-processor's address, and the first payload includes a descriptor of the first task;
when the second agent is retrieving the second task from the task pool, the second source address corresponds to an address associated with the second co-processor, the second destination address corresponds to an address associated with the task pool, and the second payload includes a second function which the second co-processor is configured to perform; and
when the second agent is returning from the task pool, the second source address is the task pool's address, the second destination address is the second co-processor's address, and the second payload includes a descriptor of the second task.

7. The collaborative intelligence system of claim 6, wherein the first co-processor is configured to perform at least one of depositing a new task into the task pool and modifying a task within the task pool.

8. The collaborative intelligence system of claim 7, wherein the first co-processor is an unmanned autonomous vehicle configured to operate as at least one of a ground vehicle and an aerial vehicle in connection with defense field operations.

9. The collaborative intelligence system of claim 7, wherein the first co-processor is configured to determine when it has available processing capacity, and to dispatch the first agent to the task pool in response to the determination.

10. The collaborative intelligence system of claim 7, wherein neither the controller nor the task pool are incorporated into either the first or second co-processor.

11. A method of using collaborative intelligence to achieve an objective, comprising:
populating a task pool, with a controller, such that the task pool includes a plurality of tasks associated with the objective, wherein each of the tasks has a respective task type; and
dynamically introducing into an environment, on a plug-and-play basis without any communication with the controller, a plurality of autonomous co-processors, each of which is compatible with one or more of the task types,
wherein, upon introduction into the environment, the plurality of autonomous co-processors operate in solidarity with each other and the task pool to complete the objective, without communication with the controller, by: proactively retrieving a task having a compatible task type from the task pool; completing the task; and updating the task pool to reflect completion of the task.

12. The method of claim 11, wherein at least one of the plurality of autonomous co-processors are configured to modify an existing task in the task pool.

13. The method of claim 11, wherein at least one of the plurality of autonomous co-processors are configured to add a task to the task pool.

14. The method of claim 11, wherein:
at least one of the plurality of co-processors includes an agent configured to select from the task pool a task of a compatible type and deliver the selected task to the at least co-processors.

15. The method of claim 11, wherein the at least one co-processor is configured to determine whether it has available processing capacity, and to dispatch the agent to the task pool in response to the determination.

16. The method of claim 11, wherein the plurality of autonomous co-processors retrieve the tasks from the task pool via a wireless data connection.

17. The method of claim 11, wherein:
at least one of the plurality of co-processors includes an agent configured to instruct the task pool to select a task of a compatible type and deliver the selected task to the at least co-processors.

* * * * *

(12) INTER PARTES REVIEW CERTIFICATE (4174th)

United States Patent
Iniguez

(10) Number: US 10,592,275 K1
(45) Certificate Issued: Oct. 31, 2025

(54) SYSTEM AND METHOD FOR SWARM COLLABORATIVE INTELLIGENCE USING DYNAMICALLY CONFIGURABLE PROACTIVE AUTONOMOUS AGENTS

(71) Applicant: Alfonso Iniguez

(72) Inventor: Alfonso Iniguez

(73) Assignee: SWARM TECHNOLOGY LLC

Trial Numbers:

IPR2022-00141 filed Nov. 4, 2021
IPR2022-00633 filed Feb. 25, 2022

Inter Partes Review Certificate for:

Patent No.: 10,592,275
Issued: Mar. 17, 2020
Appl. No.: 15/852,480
Filed: Dec. 22, 2017

The results of IPR2022-00141 and IPR2022-00633 are reflected in this inter partes review certificate under 35 U.S.C. 318(b).

INTER PARTES REVIEW CERTIFICATE
U.S. Patent 10,592,275 K1
Trial No. IPR2022-00141
Certificate Issued Oct. 31, 2025

AS A RESULT OF THE INTER PARTES REVIEW PROCEEDING, IT HAS BEEN DETERMINED THAT:

Claims 1-17 are found patentable.

\* \* \* \* \*